UNITED STATES PATENT OFFICE.

AUGUST RIESCH, OF MUNICH, GERMANY.

ARTIFICIAL MARBLE AND PROCESS OF MAKING THE SAME.

No. 897,493.

Specification of Letters Patent.

Patented Sept. 1, 1908.

Application filed November 4, 1907. Serial No. 400,561.

*To all whom it may concern:*

Be it known that I, AUGUST RIESCH, a subject of the Emperor of Germany, and a resident of Munich, in the Kingdom of Bavaria, Germany, have invented certain new and useful Improvements in Artificial Marble and Processes of Making the Same, of which the following is a specification.

The object of my invention is to produce a composition of matter which shall have the appearance of natural marble and which may be used for the covering of floors, table tops, and such articles, and which in use will not crack readily.

In carrying out my invention I first form a body of a mixture of material, which when moistened will form into minute particles. Then I sprinkle the particles with a dry coloring matter, which will form a coating or shell around each of the said particles, so that when the composition is spread over the surface to be coated, the spreading or flattening out of these minute particles will form veins of coloring material, which will resemble the veins of natural marble upon the setting or hardening of the composition.

The body material is formed of cement, saw-dust and mineral filling matter. These substances are mixed together in the following proportions: To ca. 9 parts of cement I add ca. 20 parts of saw dust and ca. 1 part of mineral filling matter. The kind of cement base I prefer to use is oxid of magnesium. The kind of mineral filling matter I prefer to use is white stone-dust, like lime-dust or asbestos etc. The saw-dust should be of the fineness of powder, that is, the particles should not be more than a millimeter in diameter. After I have mixed the cement, the saw-dust and the mineral filling matter together as aforesaid, I moisten them with a solution of chlorid of magnesium. In so moistening the mixture I use only enough of the solution of chlorid of magnesium to cause the materials to cohere in minute particles, giving it the appearance of being made up of minute globules. I prefer to use a solution of chlorid of magnesium which contains ca. 6.25–7.00 parts of the said salt to ca. 7.75–ca. 9 parts of water. To cause the solution of chlorid of magnesium to mix with the magnesium oxid, the mineral filling material and the powered sawdust, I stir them together gently while adding the fluid, thereby causing the mass to take on a granulated appearance, and I exercise care not to mash these particles or granules. After the body material has been thus moistened with the chlorid of magnesium, I sprinkle the particles with a dry coloring matter, so that the particles become coated with this coloring matter. To make the coloring matter I prefer to use oxid of magnesium and a powdered filling material. This filling material is preferably mineral matter. In mixing this dry coloring matter with the foundation material, one must be careful to avoid kneading the substances together. He must sprinkle the said coloring matter over the foundation material in a manner such that the particles of the foundation material are coated with the coloring matter. When the composition thus prepared is placed upon the surface to be coated, the composition is flattened out so that the particles or small spherical bodies are flattened out so as to fill in the interstices occurring between the bodies. In so doing, the coloring material will be filled into the interstices so as to give the product veins of color resembling the veins of natural marble.

While I have described magnesium oxid as the cement base, and a solution of magnesium chlorid as the fluid for causing the mixture of powdered saw-dust and the cement base to cohere the particles, I do not wish to limit myself to the use of these substances, since other cement bases, or other fluids, may be used, within the scope of my invention.

What I claim is:

1. A process of making artificial marble, consisting in mixing sawdust, a cement base, and mineral filling material together, then moistening this mixture with a solution of a haloid salt and mixing them so as to cause the mixture to cohere in granules, then coating the granules with a coloring material.

2. A process of making artificial marble, consisting in mixing sawdust, a cement base, and a mineral filling material together, then moistening this mixture with a solution of chlorid of magnesium and mixing them together so as to cause the mixture to cohere in granules, then sprinkling the granules with a dry mineral coloring matter.

3. A process of making artificial marble, consisting in mixing sawdust, cement and mineral filling material together, then moistening this mixture with a solution of a haloid salt and mixing them together so as to cause the mixture to cohere in granules, then sprinkling the granules with magnesium oxid and a mineral filling material to give them a coating of color.

4. A process of making artificial marble, consisting in mixing powdered sawdust and a cement base together in a dry state, then adding to this mixture a solution of a haloid salt and stirring them together so as to cause the mixture to cohere in granules, and then coating the granules with a coloring matter.

5. A composition consisting of a body made of sawdust, cement and mineral filling material made to cohere in granules by mixing them with a solution of a haloid salt of magnesium, and a coating for the particles consisting of a coloring material made of magnesium oxid and a mineral filling material.

6. A composition consisting of a body made of sawdust, cement, and a mineral filling material made to cohere in granules by mixing them with a solution of chlorid of magnesium, and a coating for the granules consisting of magnesium oxid and a mineral filling material.

AUGUST RIESCH.

Witnesses:
ABRAHAM SCHLESINGER,
LOUIS MUELLER.